UNITED STATES PATENT OFFICE.

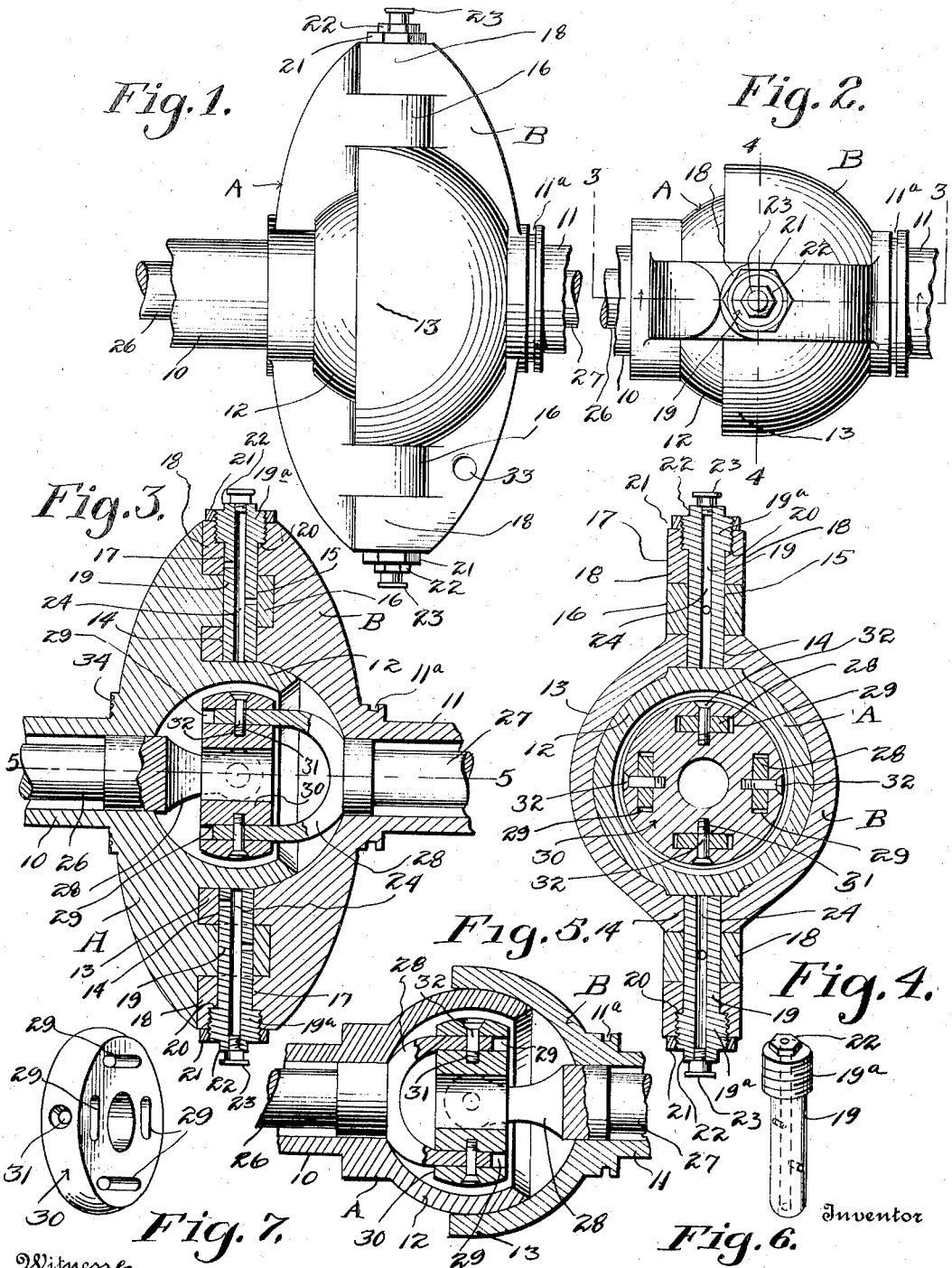

EMIL E. DAHLMON, OF CLINTONVILLE, WISCONSIN.

DRIVE CONNECTION FOR DIRIGIBLE VEHICLE-WHEELS.

1,307,961.　　　　Specification of Letters Patent.　　Patented June 24, 1919.

Application filed April 24, 1918.　Serial No. 230,473.

*To all whom it may concern:*

Be it known that I, EMIL E. DAHLMON, a citizen of the United States, residing at Clintonville, in the county of Waupaca, State of Wisconsin, have invented certain new and useful Improvements in Drive Connections for Dirigible Vehicle-Wheels; and I do hereby declare the following to be a full, clear, and exact description of the invention, such as will enable others skilled in the art to which it appertains to make and use the same.

This invention relates to new and useful improvements in drive connections for dirigible vehicle wheels.

It is in general the object of the present invention to simplify the structure and increase the strength of devices of this character, and it is more particularly an object to provide an effective two-part housing for the universal drive coupling of the wheel.

A further object resides in the provision of a simplified steering knuckle structure for the wheel wherein a maximum durability and strength and ease of assembly is afforded.

A still further object resides in the provision of an improved universal coupling associated with the aforementioned structure in a manner permitting a most ready assembly and a most compact structure.

With the above and other objects and advantages in view, the invention resides more particularly in the novel combination, formation and arrangement of parts hereinafter described and particularly pointed out in the appended claims.

In the accompanying drawings:

Figure 1 is an elevational view of a wheel mounting embodying my present invention.

Fig. 2 is a top plan view thereof.

Fig. 3 is a vertical sectional view therethrough on the line 3—3 of Fig. 2.

Fig. 4 is a transverse vertical sectional view on the line 4—4 of Fig. 2.

Fig. 5 is a horizontal sectional view on the line 5—5 of Fig. 3.

Fig. 6 is a perspective view of one of the steering spindles.

Fig. 7 is a perspective view of the universal coupling head.

Referring now more particularly to the accompanying drawings, there is provided a pair of steering spindle heads A and B. Secured to the head A is a sleeve or skein 10 and secured to the head B is a tubular wheel receiving spindle 11 of preferably conventional type, the usual wheel washer groove 11$^a$ being provided at its inner end. The spindle heads extend vertically above and below the skein and wheel spindle to form substantially a pair of hinge plates. Formed at the inner side of the spindle head A is a hollow enlargement 12 of spherical contour, and truncated at its outer side, which is open. This enlargement is engaged through an annular extension 13 at the inner side of the spindle head B, the head having a spherical concavity therewithin receiving the outer portion of the enlargement 12, the concavity within the head B and the hollow within the extension 12 thus forming a chamber whose volume is not affected by relative pivotal movement of the heads on an axis including the center of the chamber, as will be understood. There is thus formed what in effect is a hollow ball and socket joint.

To connect the heads for proper pivotal steering movement, the wall of the extension 13 is provided with vertically alined bearing openings 14, whose common axis includes the center of the chamber, and these bearing openings are in alinement with and register with bearing openings 15 formed in lugs 16 projected from the head A, and with bearing openings 17 formed in lugs 18 projected from the head B immediately outward of the lugs 16. A spindle 19 is engaged in each set of bearing openings thus provided, and the spindles are secured in the openings by annular threaded heads 19 on their outer ends which are engaged in threaded countersunk outer portions 20 of the openings 17, locknuts 21 being threaded on these heads and engaging the outer sides of the lugs 18. Each spindle is preferably extended past its head 19 and provided with squared wrench faces 22, and threaded in the outer extremity of each spindle is a grease cup 23 adapted to feed lubricant through a longitudinal bore 24 in the spindle which communicates with the bearing faces of the spindle openings by means of the lateral extensions 25.

Journaled in the skein 10 is a drive shaft 26 and journaled in the wheel spindle 11 is a stub shaft 27 for driving connection with the wheel (not shown). The universal coupling for these shafts comprises a pair of yokes 28 secured to the shafts within the coupling chamber and having their arms extended into diametrically opposed pairs of slots 29 formed in a coupling disk 30. Each of these slots extends transversely of the diameter of the disk adjacent its periphery, and traversing each slot is a radial bore 31 formed in the disk for the reception of a pivot pin 32 which passes also through the corresponding arm of a shaft yoke and which is threaded at its inner end for engagement with threads formed in the inner end of the bore whereby the intermediate portion of the pin forms a bearing for the yoke arm. The disk is preferably hollow at its center to lighten it, and it is of such diameter as to just fit within the mouth of the truncated hollow sphere 12, it being noted that the interior diameter of this sphere is greater than the diameter of said mouth. The coupling disk is positioned in the chamber in such manner that the axial plane of the pivot pins 32 includes the common axis of the steering spindles.

By the foregoing arrangement, a continuous drive is afforded the wheel shaft 27, while permitting pivotal steering movement of said shaft and its spindle head B. Each of the spindle heads may be integrally cast, to provided a structure of exceeding simplicity and strength, which may be manufactured at a comparatively low cost. The outer ends of the lugs 16 and 18 are rounded to permit relative movement with respect to the opposing head portions, and those portions of the head A opposite the outer edge of the cylinder 13 are correspondingly rounded. Said heads form substantially a pair of hinge plates.

The head B is provided at its lower portion with an aperture 33 for the reception of usual operating arm of the steering gear, and at the juncture of the head A and skein 10, the usual apertures 34 are provided for securing the spring seat.

The further fact is noted that the steering pivot spindles 18 have end thrust bearings on the vertically opposed outer face portions of the spherical member 12 which face portions are preferably flattened for its bearing, as shown particularly in Fig. 4. This arrangement adds materially to the ease of operation of the steering structure, since it prevents tendency of vertical distortion of the outer knuckle head B with a consequent binding of the spindles against their various peripheral bearing surfaces.

What is claimed is:

1. A wheel mounting comprising a pair of steering knuckle heads, a truncated hollow spherical enlargement on one of said heads, the other head having a spherical cavity receiving said spherical enlargement and forming therewith a coupling chamber, bearing lugs on the first specified knuckle head outwardly of said spherical enlargement, bearing lugs on the last mentioned head inwardly and outwardly of the first named lugs, all said bearing lugs being provided with registering journal openings, spindles mounted in said journal openings, the openings of the outer lugs being countersunk, heads on the outer ends of the spindles threaded in said counter sinks, shafts extending through the steering knuckle heads, and a universal coupling for the shafts in said coupling chambers.

2. A wheel mounting comprising a pair of steering knuckle heads, a truncated hollow spherical enlargement on one of said heads, the other head having a spherical cavity receiving said spherical enlargement and forming therewith a coupling chamber, bearing lugs on the first specified knuckle head outwardly of said spherical enlargement, bearing lugs on the second named head inwardly and outwardly of the first named lugs, spindles journaled in said lugs, said spindles having end thrust bearing engagement with said truncated spherical enlargement, shafts extending through said heads and a universal coupling for the shafts in said coupling chamber.

In testimony whereof, I affix my signature, in the presence of two witnesses.

EMIL E. DAHLMON.

Witnesses:
T. S. RATCLIFFE,
F. E. DENNISON.